United States Patent [19]
Harrington, James M. et al.

[11] Patent Number: 4,863,644
[45] Date of Patent: Sep. 5, 1989

[54] GAS DIFFUSER

[75] Inventors: Harrington, James M., Austin; Henry J. Hervol, Round Rock; William N. Walton, Austin, all of Tex.

[73] Assignee: Enviroquip, Inc., Austin, Tex.

[21] Appl. No.: 267,521

[22] Filed: Nov. 4, 1988

[51] Int. Cl.$^4$ .............................................. B01F 3/04
[52] U.S. Cl. ...................................... 261/77; 261/123
[58] Field of Search .................................. 261/123, 77

[56] References Cited

U.S. PATENT DOCUMENTS

| | | | |
|---|---|---|---|
| 414,370 | 11/1989 | Blackmore . | |
| 1,441,560 | 1/1923 | Connors | 261/123 |
| 3,148,509 | 9/1964 | Laurie | 261/123 |
| 3,207,313 | 9/1965 | Schulze . | |
| 3,228,526 | 1/1966 | Ciabattari et al. | 261/123 |
| 3,446,488 | 5/1969 | Mail et al. | 261/77 |
| 3,679,187 | 7/1972 | Smith | 261/77 |
| 3,931,370 | 1/1976 | Murphy | 261/123 |
| 4,005,014 | 1/1977 | Wikey | 261/123 |
| 4,060,574 | 11/1977 | Verner et al. . | |
| 4,070,423 | 1/1978 | Pierce | 261/123 |
| 4,331,542 | 5/1982 | Emrie . | |
| 4,421,696 | 12/1983 | Graue et al. . | |
| 4,486,361 | 12/1984 | Durot et al. | 261/77 |
| 4,655,918 | 4/1987 | Eertink . | |
| 4,720,360 | 1/1988 | Melber . | |

FOREIGN PATENT DOCUMENTS

| | | | |
|---|---|---|---|
| 848331 | 8/1970 | Canada | 261/123 |
| 1088218 | 10/1967 | United Kingdom | 261/123 |
| 1519644 | 8/1978 | United Kingdom | 261/123 |

*Primary Examiner*—Tim Miles
*Attorney, Agent, or Firm*—Arnold, White & Durkee

[57] ABSTRACT

A gas diffuser is provided for water and wastewater treatment. The gas diffuser unit includes a vertical open-bottomed injection pipe extending downwardly and having a plurality of vertical slot-shaped ports adjacent the open bottom. A gas bubble distribution body including a lip portion is located above the open bottom of the injection pipe, and a conical shaped deflector may be mounted on the gas injection pipe above the distribution body. Gas released from the vertical slot-shaped ports forms relatively large diameter bubbles which rise due to buoyancy. The large diameter gas bubbles are broken into smaller diameter gas bubbles and are evenly distributed upon the bottom surface of the gas bubble distribution body above the open bottom of the injection pipe. The lip portion on the gas distribution body promotes turbulence in the rising bubbles, and produces smaller diameter gas bubbles. The smaller diameter gas bubbles are further broken down into even smaller gas bubbles and more widely distributed by the deflector mounted above the bubble distribution body on the gas injection pipe. The generation of even smaller gas bubbles and wider distribution of the gas bubbles provides better mixing of the gas bubbles with liquids, and provides a larger surface interface between the gas bubbles and the liquid body resulting in higher gas transfer efficiency. A shaft tube surrounding the gas distribution body may be provided to further enhance gas transfer efficiency.

11 Claims, 2 Drawing Sheets

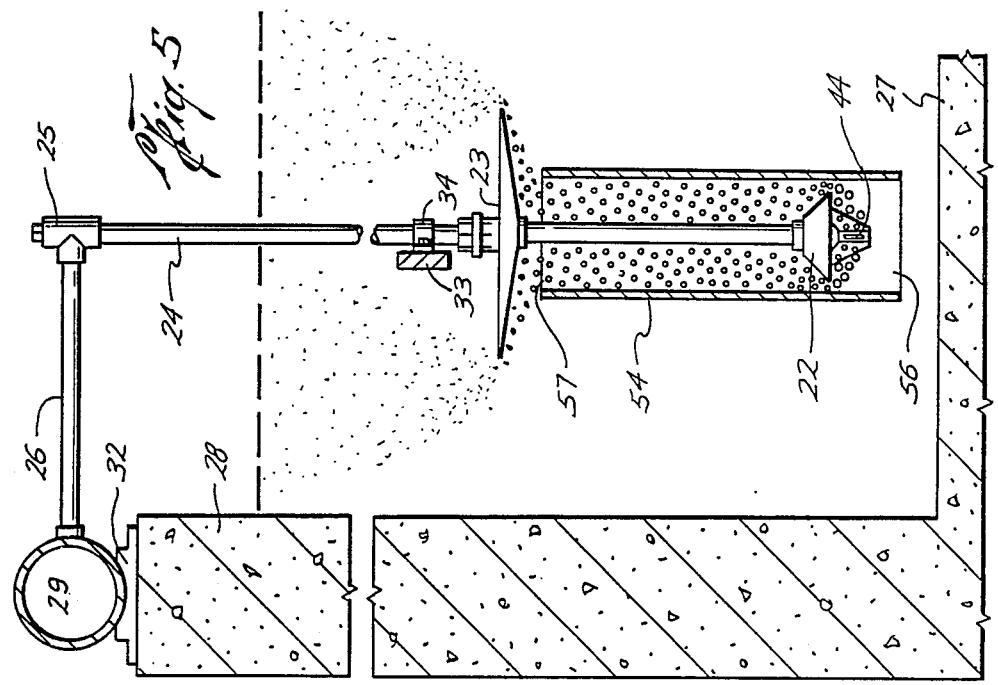
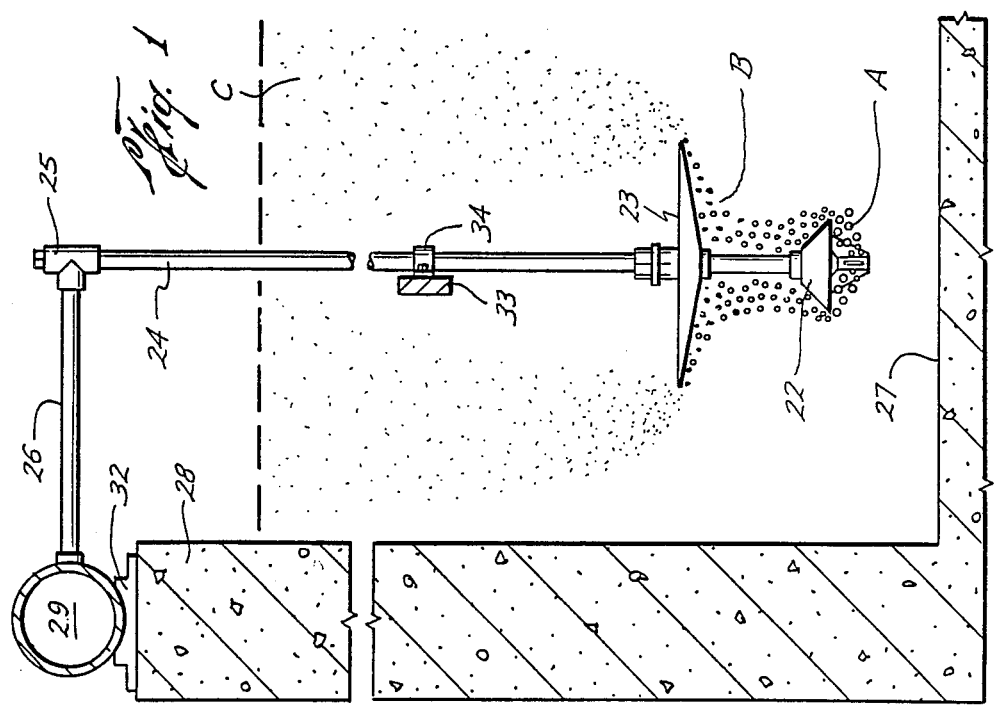

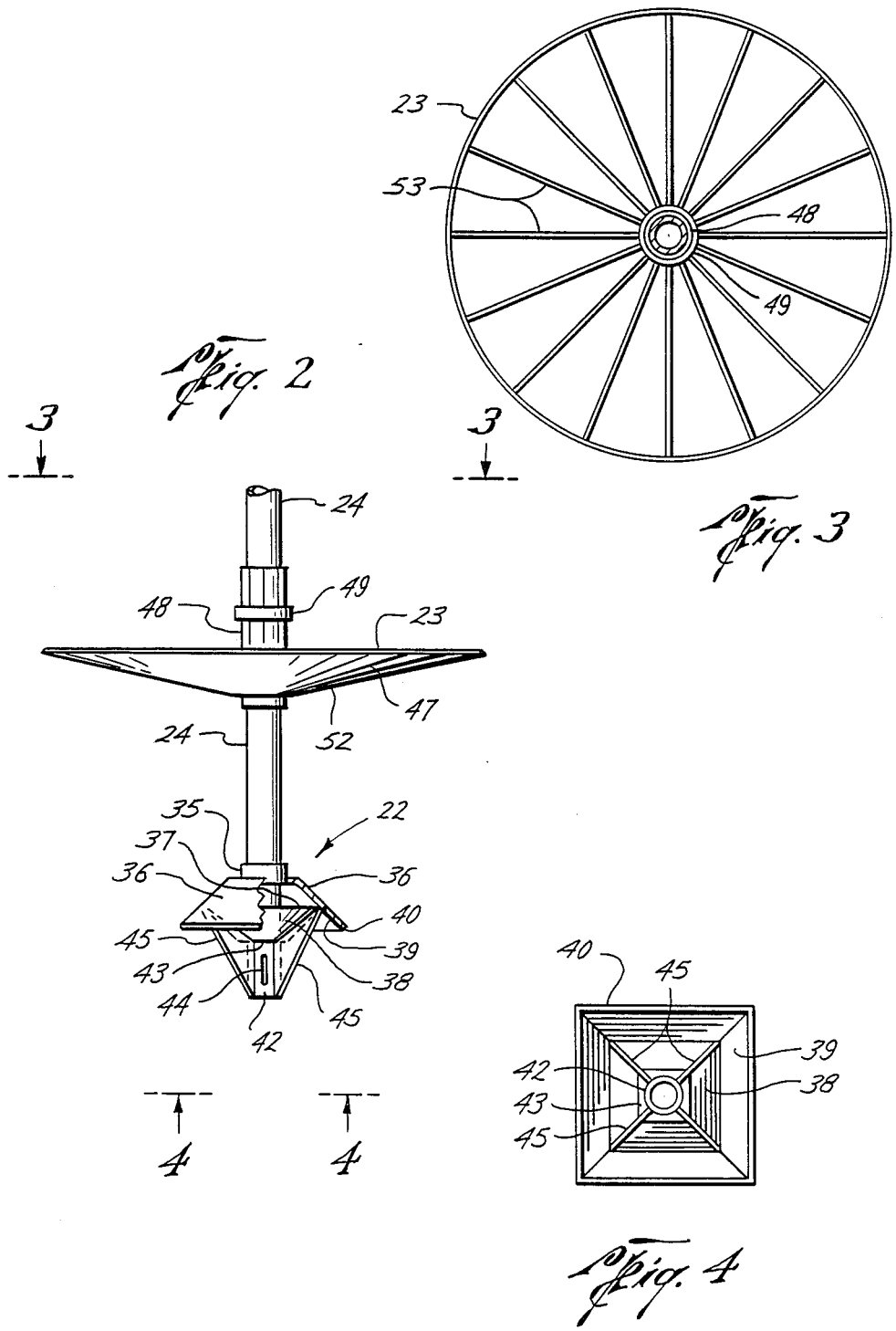

GAS DIFFUSER

FIELD OF THE INVENTION

The invention relates to diffusers of gas in liquid, particularly in wastewater.

BACKGROUND OF THE INVENTION

Wastewater, whether of domestic or industrial origin, should be treated properly before it is discharged into a natural water course. Major steps in conventional wastewater treatment plants involve a gas transfer, for example an oxygen transfer process. The activated sludge process, which is currently the most popular method of biological wastewater treatment, and aerobic digestion for sludge treatment each require aeration where oxygen in air is transferred into a liquid phase (wastewater). Other processes which involve gas transfer include ammonia stripping for removal of ammonia in wastewater where ammonia gas is transferred from a liquid phase to supplied air bubbles and eventually to the atmosphere. The efficiency of gas transfer depends in part on the area of the liquid gas interface as described by the two-film theory, wherein the interface area through which gas transfer can take place increases with decreasing gas bubble size at a constant gas flow rate. Gas transfer efficiency also depends on the degree of turbulence or agitation of wastewater since higher turbulence results in thinner liquid film and reduced resistance of transfer of gas into the bulk liquid phase.

Oxygen transfer (aeration) in wastewater treatment plants is an energy-intensive process which can consume as much as 50 to 90 percent of the net power demand for a treatment plant. Many treatment plants are replacing and upgrading older and less efficient aeration devices since installation of higher efficiency aeration devices reduces the cost of aeration.

One type of gas diffuser device known in the art generates fine air bubbles with a diameter of 2 to 4 mm by use of a porous plate made from alumina or silica material. The small gas bubbles emanating from small openings in the porous medium increase the gas-liquid interface area resulting in a relatively high gas transfer efficiency. However, this fine bubble gas diffuser is susceptible to clogging.

Another type of gas diffuser device, known in the art is a coarse bubble gas diffuser, is shown in U.S. Pat. Nos. 3,679,187 and 4,421,696. Both of these gas diffuser devices have a body directly above slot-shaped ports in a gas distribution tube. The gas bubble distribution body above the gas distribution tube provides a surface for gas bubbles to disperse to a shear edge on which gas bubbles are broken down to smaller sized bubbles and mixed with the water. The bottom of the gas bubble distribution body typically has a truncated pyramidal or conical shape which extends upwardly and outwardly from the vertical gas injection pipe. As a result of the shape of the bottom of the bubble distribution body, however, the gas bubbles leaving the ports in the gas distribution tube are not significantly disturbed. Thus, the bubbles rise vertically above the bubble distribution body forming a thick and dense bubble column, and gas transfer is hampered.

There is a need to create more turbulence for wider distribution of gas bubbles in liquid and break up of gas bubbles into smaller sizes, while at the same time minimizing clogging.

SUMMARY OF THE INVENTION

A gas diffuser device according to the present invention provides a substantial increase in gas transfer efficiency compared with the prior art gas diffusers. In the present invention, a lip is provided at an edge of the gas bubble distributor. The shape of the lip is preferably frustum-shaped such as a truncated cone or truncated pyramid. While the bottom surface of the bubble distribution body extends upwardly and outwardly from the vertical gas injection pipe, the lip extends downwardly and outwardly at the edge of the bubble distribution body. The presence of the lip at the edge of the bubble distribution surface creates more turbulence resulting in generation of smaller diameter gas bubbles and wider distribution of gas bubbles. As a consequence, the gas transfer rate improves.

According to another aspect of the present invention, a deflector with a relatively large diameter is provided above the bubble distribution body which further breaks up the rising small gas bubbles into even smaller bubbles and further disperses the rising bubbles. The deflector exploits the pumping effect of the gas-liquid mixture rising from the gas bubble distributor, and enhances bubble break-up and enlarges the bubble plume at a greater submergence depth. As a consequence, the gas transfer rate further improves.

Another aspect of the present invention is the provision of a draft tube surrounding the gas bubble distributor. The open bottom end of the draft tube is located near the bottom of the liquid tank. The gas bubble distributor is located within the draft tube between the draft tube's open bottom and open top ends. The gas bubble deflector is located above the open top end of the draft tube. The combination of the bubble distributor with deflector and draft tube further increases the size of the bubble plume and decreases the size of the individual gas bubbles thereby further enhancing the gas transfer rate.

Any type of gas can be diffused in any liquid through use of the present invention to improve gas transfer efficiency. However, air is the most common type of gas utilized in water and wastewater treatment plants.

BRIEF DESCRIPTION OF DRAWINGS

The invention is described with reference to the accompanying drawings in which:

FIG. 1 is a fragmentary vertical section for a side wall of typical wastewater treatment aeration basin illustrating a gas diffuser unit of the present invention and the paths of rising air bubbles therein;

FIG. 2 is a side view of the gas diffuser unit of the present invention;

FIG. 3 is a top view of a deflector which is a part of the gas diffuser unit shown in FIG. 1;

FIG. 4 is a bottom view of a gas bubble distributor which is a part of the gas diffuser unit shown in FIG. 1; and FIG. 5 is a side view of another gas diffuser unit of the present invention.

DETAILED DESCRIPTION OF THE INVENTION

Referring to FIG. 1, a complete unit of gas diffuser apparatus in accordance with the present invention comprises gas bubble distributor 22, deflector 23, injection pipe 24, tee 25, and a connection pipe 26. The length of injection pipe 24 depends on the depth of the tank, but is preferably long enough so that injection pipe 24 terminates approximately two feet (0.6 meters) above tank bottom 27. The complete air diffuser system comprises a plurality of the gas diffuser units, such as shown in FIG. 1.

The units are connected in horizontally spaced relation to an air manifold 29 supplied with compressed air from a suitable source. The manifold 29 is typically supported upon pipe saddles 32. The air injection pipes are preferably maintained in accurate alignment by means of an elongated frame member 33 to which the air injection pipes are attached by means of suitable U-bolts 34, or the like. An orifice device such as that shown in U.S. Pat. No. 4,720,360, the disclosure of which is incorporated herein by reference, can be installed inside tee 25 to adjust air flow from manifold 29.

Referring now to FIGS. 2, 3, and 4, gas bubble distributor 22 is affixed to injection pipe 24 with coupler 35. Attached to coupler 35 is the top member 36 of gas bubble distribution body 37 which is frustum-shaped, such as the truncated pyramid shape shown. Attached to top member 36 of gas distribution body 37 is bottom member 38 of body 37. Bottom member 38 of gas bubble distribution body 37 is similar to top member 36 of body 38, but smaller than top member 36 and inverted so that lip 39 is formed axially outwardly and downwardly as shown in FIG. 2. The edge 40 of lip 39 serves as a shear edge for rising gas bubbles. Bottom member 38 of bubble distribution body 37 is joined with gas distribution tube 42 by means of spacer 43. Gas distribution tube 42 preferably has eight slot-shaped ports 44, which are preferably approximately one-eighth inch (0.32 cm) wide and approximately two to three inches (5.1 cm to 7.6 cm) long. It is understood that gas distribution tube 42 could have more or less than eight slot-shaped ports and the ports could be wider or narrower, depending on the size of the air distribution tube, without departing from the spirit of the invention. For example, in a two-inch (5.1 cm) inside-diameter gas distribution tube, sixteen slot-shaped ports approximately one-eighth inch in width may be provided. A plurality of drift control vanes 45 are provided which extend from the lower extremity of gas distribution tube 42 to a joint between bottom member 38 and top member 36 of gas distribution body 37.

Although bottom member 38 and top member 36 of gas distribution body 37 are depicted in the figures as truncated four-sided pyramids, any frustum shape may be used including truncated polygonal pyramids and truncated cones. In general, bottom member 38 is frustum-shaped with its minor base, i.e., the smaller of the two bases of the frustum, located nearer ports 44 than its major base. In other words, the side or sides of bottom member 38 diverge in a direction away from ports 44. Top member 36 is also frustum-shaped with its minor base located further away from ports 44 than its major base. In other words, the side or sides of top member 36 diverge in a direction toward ports 44. As frustum-shaped top member 36 diverges in a direction toward ports 44, it intersects the periphery of the major base of frustum-shaped bottom member 38. Top member 36 extends past the periphery of the major base of bottom member 38 and continues to diverge to form lip 39. The periphery of the major base of top member 38 forms shear edge 40 on lip 39.

It should be noted that although the periphery of the minor base of frustum-shaped top member 36 is shown in the figures to be adjacent the outer circumference of injection pipe 24, it is emphasized that the periphery of the minor base of top member 36 may be coincident with the periphery of the major base of bottom member 38, or may be located anywhere between the major base of bottom member 38 and the circumference of pipe 24, as long as the "M" shaped cross-section of bottom surface 38 with lip 39 is preserved.

Deflector 23 can be used with gas diffuser 22, and comprises a frustum-shape such as truncated cone 47, and hollow pipe 48 at the vertical central axis of cone 47 as shown in FIG. 2. Deflector 23 is affixed to gas injection pipe 24 using clamp 49, or the like. Bottom 52 of deflector 23 preferably has a frustum shape such as a conical shape to produce a smooth surface and therefore is preferably substantially circular in horizontal cross-section. Surface 52 of the bottom of deflector 23 diverges in a direction away from ports 44. Right-triangle shaped spacers 53 are provided between truncated cone 47 and hollow pipe 48 as shown in FIG. 3. It will be understood that the means to connect the truncated cone 47 to hollow pipe 48 is not critical, and any suitable connection construction could be utilized. In addition, although a frusto-conical shape is preferred for deflector 23, any other frustum shape, for example a truncated polygonal pyramid, may be used.

In order to achieve the greatly improved results of the present invention, deflector 23 should be located above distributor 22 but in close relation to diffuser 22, preferably less than 48 inches (1.2 cm), to create optimum turbulence in the rising air bubbles and to break the rising air bubbles into smaller size bubbles. The size of truncated cone 47 of deflector 23 should be large enough to block the paths of rising bubbles, and preferably larger in diameter than distributor 22. The specific location of deflector 23 relative to distributor 22, and the specific size of deflector 23 are chosen depending on the amount of air to be diffused and the size of air injection pipe 24, and can be determined by routine experimentation in light of the present disclosure. It should also be noted that more than one deflector 23 can be connected to injection pipe 24 in a stacked configuration. Other variations and changes can be made by those skilled in the art without departing from the spirit and scope of the invention.

In operation, the aeration tank is substantially filled with polluted wastewater or so-called mixed liquor. Referring again to FIGS. 1 and 2, compressed air from manifold 29 passes through connector pipe 26, tee 25, air injection pipe 24 and is released from slot-shaped ports 44. Relatively coarse air bubbles, as indicated at A in FIG. 1 leaving the ports 44 are distributed upon bottom member 38 of bubble distribution body 37 while rising and approaching shear edge 40. The contact with the surface of bottom member 38 of the distribution body shears and disperses the coarse bubbles. Also the presence of lip 39 blocks the paths of rising air bubbles for a moment creating more turbulence and breaking up the coarse bubbles into smaller diameter air bubbles. As a consequence, a larger interface area between the air bubbles and the liquid (wastewater) will be provided. If deflector 23 is provided, the smaller air bubbles will continue rising as indicated at B in FIG. 1 and strike and disperse again upon bottom surface 52 of deflector 23, creating even smaller air bubbles and even greater turbulence. Proper placement of deflector 23 to take full advantage of the rolling and pumping action of the gas-liquid mixture within the aeration tank enhances gas bubble break-up and enlarges the bubble plume at a greater submergence depth in the aeration tank. The combination of the narrow width of ports 44, lip 39 with shear edge 40 on the bubble distribution body, and deflector 23 creates maximum air bubble dispersion and generates medium bubbles (somewhere between coarse and fine bubbles) above deflector 23 as indicated at C in FIG. 1.

Referring now to FIG. 5, another embodiment of the present invention is shown including draft tube 54. Draft tube 54 is preferably cylindrical, however it may be polygonal in cross-section without departing from the spirit and scope of the present invention. Tube 54 is supported by support means (not shown) to surround gas bubble distributor 22. An open bottom end 56 of draft tube 54 is located below gas discharge ports 44 of gas bubble distributor 22, and above tank bottom 27. Deflector 23 is located above open top end 57 of draft tube 54. Draft tube 54 increases the velocity of gas bubbles rising therein, and when these increased velocity gas bubbles impinge upon deflector 23, a wider gas bubble plume with finer gas bubbles results thereby further enhancing gas transfer efficiency.

The exact placement of draft tube 54, gas bubble distributor 22, and deflector 23 relative to one another and relative to tank bottom 27 can be determined and optimized for individual aeration tank applications. It should be noted that when draft tube 54 is used, deflector 23 is preferably located further from gas bubble distributor 22 than applications which do not use draft tube 54.

The principles and preferred embodiment of the present invention have been described in the foregoing specification and accompanying drawings. The invention is not to be construed as limited to the particular forms disclosed, since these are regarded as illustrative. It will be evident that variations and changes are possible without departing from he spirit of the invention.

What is claimed is:

1. An apparatus for diffusing gas in liquid, comprising:
   a gas injector tube having a first end connectable to a supply of gas, and having a second end submersible in a liquid, said second end including a plurality of gas discharge ports; and
   a gas bubble distributor connected to said gas injector tube and located intermediate said first and second ends, said gas bubble distributor including:
   a first frustum-shaped surface having a central axis substantially aligned along an axis of said gas injector tube, a periphery of a minor base of said first surface surrounding said tube, said first surface diverging in a direction away from said second end of said gas injector tube and terminating at a periphery of a major base of said first surface; and
   a second frustum-shaped surface having a central axis substantially aligned along said axis of said gas injector tube, said second surface intersecting said periphery of said major base of said first surface and diverging from said periphery in a direction toward said second end of said gas injector tube and terminating at a gas bubble shear edge.

2. An apparatus as recited in claim 1 wherein said gas discharge ports comprise slots in said gas injector tube substantially aligned along said axis of said gas injector tube.

3. An apparatus as recited in claim 1 further comprising:
   at least one gas bubble deflector connected to said gas injector tube and located intermediate said gas bubble distributor and said first end of said gas injector tube, each said gas bubble deflector including a frustum-shaped deflector surface having a central axis substantially aligned along an axis of said gas injector tube, a periphery of a minor base of each said deflector surface surrounding said gas injector tube, each said deflector surface diverging in a direction away from said second end of said gas injector tube.

4. An apparatus as recited in claim 3 wherein said deflector surface is frusto-conical.

5. An apparatus as recited in claim 4 wherein a diameter of said deflector surface is greater than a maximum dimension of said gas bubble shear edge measured in a direction perpendicular to said longitudinal axis of said gas injector tube.

6. An apparatus as recited in claim 3 further comprising a draft tube surrounding said gas bubble distributor and having a longitudinal axis substantially aligned along said axis of said gas injector tube and having first and second open ends, said first open end being located between said gas bubble distributor and said at least one gas bubble deflector, and said second open end extending beyond said second end of said gas injector tube.

7. An apparatus as recited in claim 1 further comprising a plurality of drift control vanes extending from said second end of said gas injector tube to said periphery of said major base of said first surface.

8. An apparatus for diffusing gas in liquid, comprising:
   a gas injector tube having a first end connectable to a supply of pressurized gas, and having a second end submersible in a liquid, said second end including at least one gas discharge port;
   a gas bubble distributor connected to said gas injector tube and located intermediate said first and second ends of said gas injector tube, said gas bubble distributor having an outer periphery and a lip portion diverging from said outer periphery in a direction toward said second end and terminating at a gas bubble shear edge; and
   at least one gas bubble deflector connected to said gas injector tube intermediate said gas bubble distributor and said first end of said gas injector tube, each said gas bubble deflector having an outer periphery greater than said outer periphery of said gas bubble distributor.

9. An apparatus as recited in claim 8 further comprising a gas bubble draft tube aligned with and surrounding said gas injector tube, said gas bubble draft tube having first and second open ends, said first open end being located intermediate said gas bubble distributor and said at least one gas bubble deflector, and said second open end being located beyond said second end of said gas injector tube including said at least one gas discharge port.

10. An apparatus for diffusing air in wastewater comprising:
    an air injection tube submersible in waste water;
    an air bubble diffuser connected to an end of said air injection tube, said diffuser including a tubular air bubble discharge portion, a frustum-shaped bubble distributing surface diverging in a direction away from said bubble discharge portion and terminating at an outer periphery, a lip portion diverging from said outer periphery in a direction toward said bubble discharge portion and terminating at an air bubble shear edge, said air bubble diffuser having a central axis substantially aligned with a longitudinal axis of said air injection tube; and an air bubble deflector connected to said air injection tube above said air bubble diffuser, said deflector having a bubble deflecting surface diverging in a direction away from said air bubble diffuser.

11. The apparatus of claim 10 further comprising:

a draft tube having a longitudinal axis substantially aligned with said longitudinal axis of said air injection tube and surrounding said air bubble diffuser, said draft tube having a first open end located between said diffuser and said deflector, and having a second end located below said air bubble discharge portion of said air bubble diffuser.

* * * * *